Patented Apr. 10, 1951

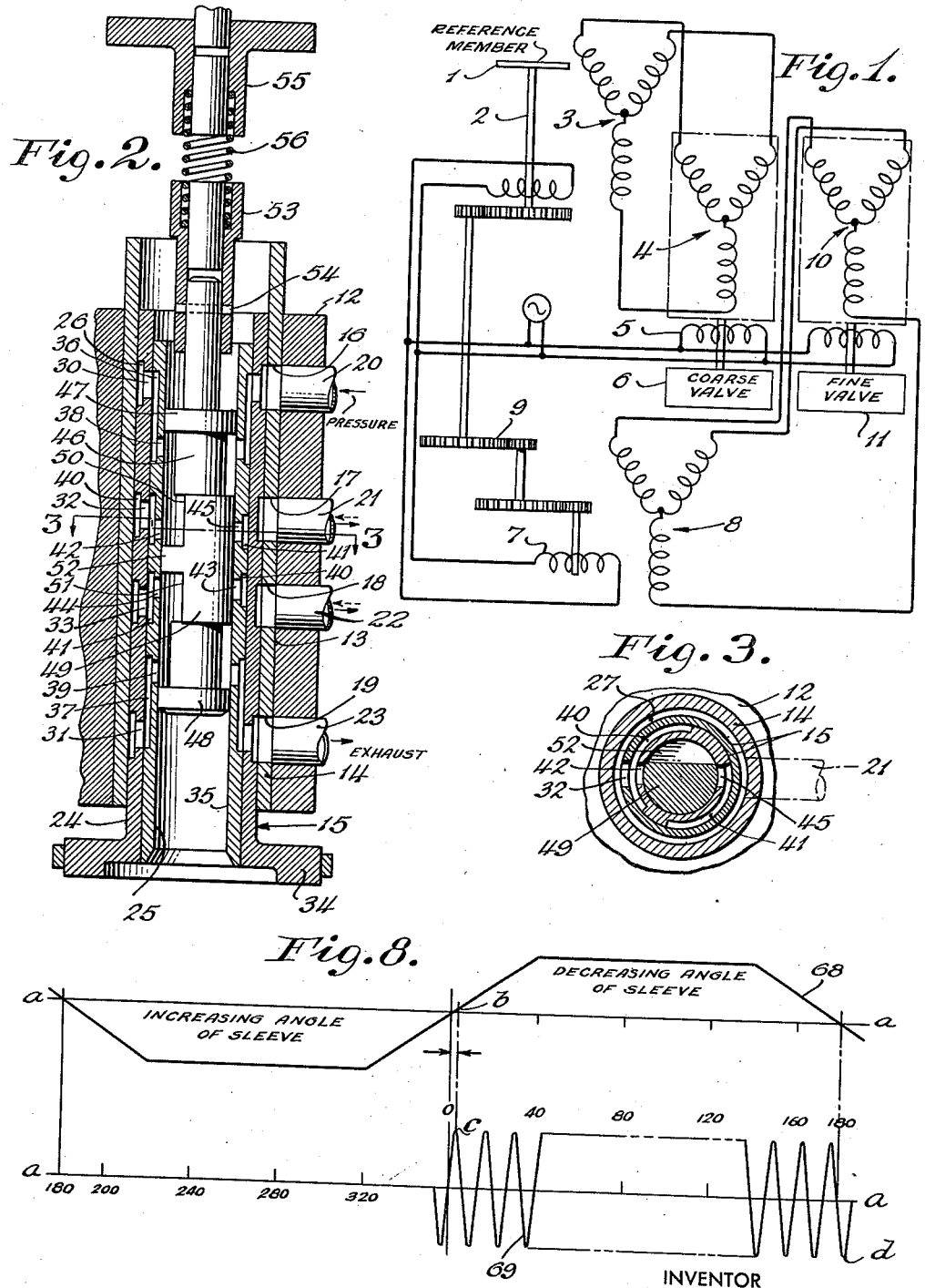

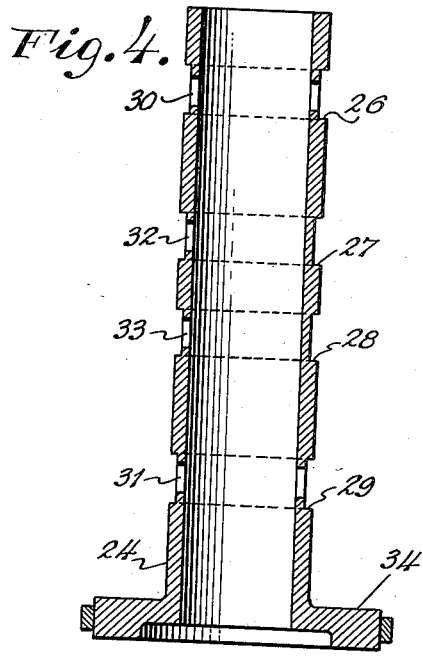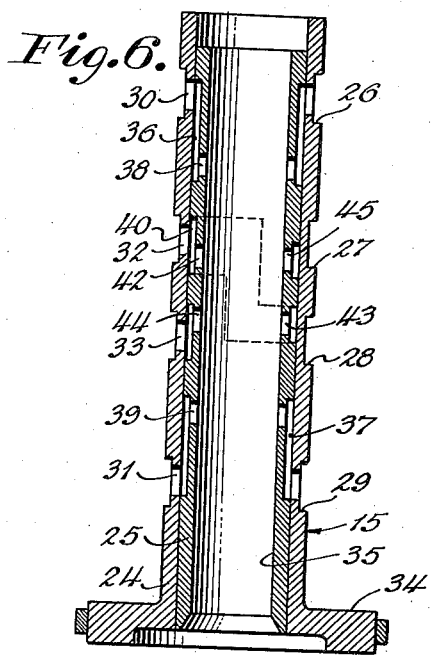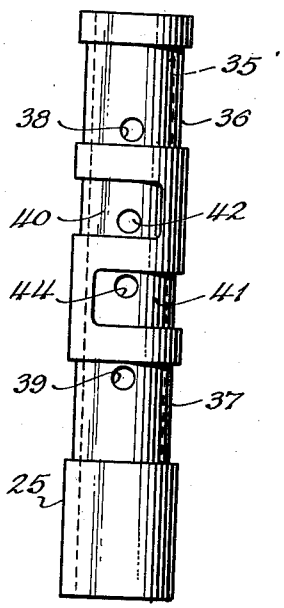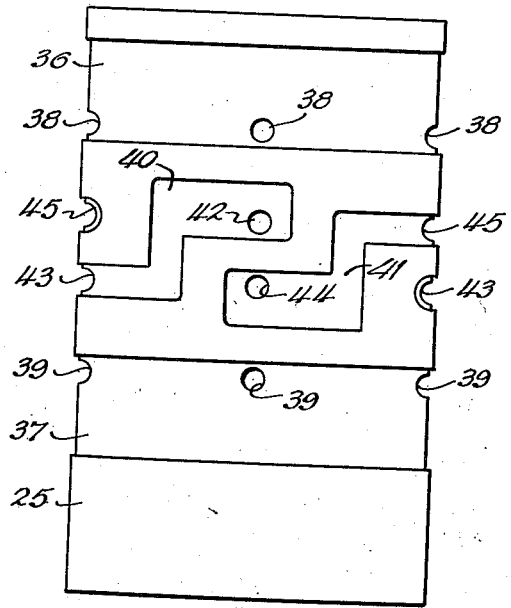

2,547,929

UNITED STATES PATENT OFFICE 2,547,929

FLUID-CONTROL VALVE

Edward Dawson, New York, N. Y., assignor to The Sperry Corporation, a corporation of Delaware Original application May 17, 1943, Serial No. 487,395. Divided and this application July 24, 1947, Serial No. 763,308

12 Claims. (Cl. 251—105)

My invention relates to a control system for servo motors particularly useful in computer systems and in which coarse and fine fluid control valves are employed to control both the direction and rate of operation of the associated servo motor.

The present invention relates to a novel form of fluid control valve; and this application is a division of copending application Serial No. 487,395, filed May 17, 1943, now Patent No. 2,426,986, issued September 9, 1947, for Hydraulically Synchronized Servo System Control.

In control systems of the character disclosed in said parent application Serial No. 487,395, the fine control valve is operative to control the servo when the error angle between a reference member and the element positioned or driven by the servo does not exceed some predetermined value, while for all other, larger values of error angle the servo is controlled by the coarse valve. Ordinarily, the coarse and fine valves are operated in relatively unequal but constant ratio relationship with respect to the reference member, and the operations thereof may be effected through Selsyn systems and associated gearing. For example, angular movement of the valve element of the coarse valve may take place in a 1:1 ratio with respect to the reference member, while that of the valve element of the fine valve may take place in a 15:1 or 27:1 ratio, or in any suitable odd, preferably composite number, ratio.

A synchronizing device is employed to render the fine control valve ineffective in its control over the servomotor and to connect the servomotor directly with a source of fluid under pressure when the error angle exceeds a predetermined value. Under this latter condition, while the coarse valve, through the synchronizer, controls the direction in which the servomotor is driven, the servo will operate at maximum rate. The synchronizing device, one of the novel features of this invention, functions to return the control of the servomotor to the fine control valve when, and only when, the element driven and positioned by the servo lies within the predetermined maximum error angle with respect to the position of the reference element.

An object of this invention resides in providing a novel fluid control valve which may be employed either as the coarse or the fine control valve in a hydraulic system.

Another object lies in providing a control valve which is characterized by the fact that the rotatable valve element therewithin may be operated by torques of comparatively small magnitudes; that the valve element is hydraulically balanced whereby for all operating positions thereof, locking or binding is prevented; and the valve elements may freely rotate under all conditions. It is a further object to provide a hydraulically balanced valve of this character which is simple in construction and may be easily manufactured.

With the foregoing and other objects in view, my invention includes the novel control system and the novel control elements therein contained which are described below and illustrated in the accompanying drawings, in which:

Fig. 1 schematically represents one manner of operatively connecting the coarse and fine control valves of my system with a reference member;

Fig. 2 is a fragmentary, longitudinal section through my novel form of fluid control valve;

Fig. 3 is a transverse section of Fig. 2 taken in about the plane 3—3 thereof;

Fig. 4 is a longitudinal section of the outer member of the valve sleeve;

Fig. 5 is an elevation view of the inner member of the valve sleeve;

Fig. 6 is a longitudinal section taken through the inner and outer members of the valve sleeve operatively secured together in fixed relation;

Fig. 7 is a development of the inner sleeve member shown in Fig. 5;

Fig. 8 discloses the operational curves of the coarse and fine control valves.

In the embodiment of my invention herein illustrated and particularly illustrated in Fig. 1, I have shown a reference member indicated generally at 1 which may be positioned or moved either manually or automatically to provide a positional reference employed in controlling the operation of a servomotor and the positioning thereby of some positionable object or element. For example, the reference member may be associated with or constitute the data output shaft of a computer system and the positionable object may comprise a turret or plurality of turrets.

In the embodiment shown, the reference member 1 is directly coupled to the shaft 2 of a transmitter 3, which may be a Selsyn or Autosyn transmitter. The stator of the transmitter is electrically connected with the stator 4 of a similar device or receiver, the rotor 5 of said receiver being electrically connected with the source of alternating current employed in feeding the rotor of the transmitter 3 and rotor 5 being mechanically connected with the rotatable valve element, hereinafter described, of a coarse control valve 6. With this arrangement, the valve member of the control valve 6 will rotate synchronously with the reference member in a 1:1 ratio. The rotor 7 of a second Selsyn or Autosyn transmitter 8 is also electrically connected with the source of alternating current feeding the above-described transmitter and receiver and is mechanically connected with the rotor of the transmitter 3 through a gear train indicated generally at 9. The gear train is so arranged that the rotor 7 of transmitter 8 will rotate in a ratio of, for example, 27:1 with respect to the rotor of transmitter 3. The stator of the transmitter 8 is electrically connected with the stator of a receiver 10, the rotor of which is electrically connected with the above-mentioned source of alternating current and mechanically connected with the valve element of a second or fine control valve 11.

From the foregoing it will be observed that the valve element of valve 11 will have an angular displacement of twenty-seven times that of the valve element of control valve 6 or, in other words, the magnitude of movement of reference member 1 as reflected in the movement of the valve element of valve 11 will be magnified twenty-seven times.

In practice, the valves 6 and 11 are embodied in one casing, and, in accordance with my invention, may be substantially identical in design and size. The preferred form of my novel fluid control valve is illustrated in Fig. 2 wherein 12 indicates the valve body or casing within which the valve sleeves and rotary valve spools are rotatably mounted. The body 12 is provided with an axially extending bore 13 which, in the embodiment shown, has a sleeve 14 securely fastened therewithin and within which the valve sleeve 15 may be rotatably mounted. Sleeve 14 is provided with openings 16, 17, 18 and 19 which are adapted to register respectively with passages in the valve body 12. In each or to each of these passages is connected conduits 20, 21, 22 and 23, which are connected in the control system. Within the bore of the sleeve 14 is rotatably fitted a valve sleeve 15 and, as hereinafter described, said sleeve is designed to be oscillated to a small degree axially of the bore of the valve.

The construction of the valve sleeve 15 and its inner and outer component members is best illustrated in Figs. 4 through 7. Referring first to Fig. 4, the outer member of the valve sleeve comprises a generally cylindrical body 24 within which the inner sleeve member 25, shown in Fig. 5, is adapted to be fixedly secured, whereby the two members will move as an integral unit. The outer member 24 is provided with a plurality of axially spaced grooves 26, 27, 28 and 29 which, when operatively mounted within the valve body, are adapted continuously to register respectively with the passages 16, 17, 18 and 19.

The walls of member 24 are provided with diametrically opposed openings or ports 30 which connect with the interior thereof and with the groove 26. Likewise, openings or ports 31 connect between the groove 29 and the interior of sleeve member 24. A single port 32 affords communication between the groove 27 and the interior of the member 24 and, in axial alignment therewith, a single port opening 33 affords communication between the groove 28 and the interior of member 24. A gear 34 may be mounted on the lower end of the member 24 or may be formed integral therewith, as illustrated.

The inner member 25 of the valve sleeve, for purposes which will become apparent as the description proceeds, is designed to be mounted within the outer member 24 and secured thereto to form a unitary structure. The inner member 25 is generally cylindrical and provided with an interior, axially extending bore 35. Axially spaced grooves 36 and 37 are adapted when the two sleeve elements are fastened together to lie in communication with the lateral ports 30 and 31, respectively. Laterally extending ports 38 and 39 afford communication between the grooves 36 and 37, respectively, and the interior of the member 25. The cylindrical surface of the member 25 lying intermediate the grooves 36 and 37 is provided with a pair of grooves indicated generally at 40 and 41, which grooves extend peripherally of the member 25 slightly in excess of 180° and also axially of said member.

The configuration of grooves 40 and 41 is more clearly shown in Fig. 7. A pair of laterally extending ports 42 and 43 communicate with the interior of the member 24 and with the groove 40 adjacent opposite ends thereof. In other words, the ports 42 and 43 are diametrically opposite each other but spaced axially of the sleeve member 25. Likewise, lateral ports 44 and 45 communicate with the interior of member 25 and exteriorly thereof with the groove 41 adjacent opposite ends thereof. These ports will likewise lie generally diametrically opposite but in axially spaced relation to each other.

The relative association of the inner and outer valve sleeve members when fixed in relation to each other to provide the unitary valve sleeve structure 15 is illustrated in Fig. 6. It will be noted that groove 36 forms an annular passage within the interior of the sleeve connecting the ports 30 with the ports 38. Likewise, the groove 37 provides an interior passage connecting the ports 31 and 39. Furthermore, the groove 40 forms an interior passage connecting the port 32 in the outer sleeve member with the port 43 in the inner sleeve member whereby fluid supplied through the port 32 may be conducted axially of the valve sleeve and interiorly thereof, and discharged through the port 43 to the interior of the sleeve and in a zone diametrically opposite but axially spaced from the port 32. At the same time, the port 42 will lie in communication with the port 32. As hereinafter explained, passage of fluid through the port 42 or port 43 is controlled by a rotary valve spool rotatably mounted within the bore 35 of the valve sleeve. Similarly, although the passage formed thereby is not illustrated in Fig. 6, the groove 41 connects the exterior port 33 with the interior port 44 and also with the axially spaced interior port 45. Passage of fluid through these latter ports will also be controlled by the rotary valve spool rotatably mounted within the sleeve.

When the valve sleeve 15, comprising the inner and outer members 24 and 25, is operatively and rotatably mounted within the valve casing 12, it will occupy the position shown in Fig. 2, wherein the grooves 26, 27, 28 and 29 register respectively with the passages 16, 17, 18 and 19 in the relatively fixed valve body. As hereinafter described, means are provided for effecting a slight axial oscillation of the valve sleeve 15 and it will be clearly evident that such motion may take place because of the axial extent of the grooves in the exterior of the valve sleeve or their registering passages in the valve body.

Within the valve sleeve is rotatably mounted a rotary valve spool or piston indicated generally at 46 and comprising the spaced lands 47 and 48 which are adapted closely but slidably and rotatably to fit within the valve sleeve 15 and to effect axially spaced closures within the sleeve 15. Intermediate the lands 47 and 48, the valve 46 is provided with an enlarged cylindrical portion 49 which is adapted closely to fit within the bore of the sleeve 15. The enlarged portion 49 is milled, as indicated at 50 and 51, or otherwise formed to provide a partial cylindrical valving surface adapted to control the flow of fluid through the interior ports of the valve sleeve, adjacent which the valve 46 rotates. By milling the valve member in spaced relation as indicated, a completely cylindrical land 52 will be provided between axially spaced zones of the valving surface. The preferred circumferential extent of the valving surface 49 of the valve spool and the circumferential extent of the associated interior port openings is clearly illustrated in Fig. 3.

In Fig. 3, the valve spool has been rotated substantially 90° relative to the position thereof illustrated in Fig. 2, and it will be noted that in this position thereof the valving surface of the valve spool prevents flow of fluid between the base of the valve sleeve 15 and both ports 42 and 45. In this position of the valve, communication between the ports 44 and 43 and the bore of the sleeve 15 will likewise be cut off. Preferably, when the valve spool occupies the position shown in Fig. 3 the edges of the valving portion thereof register with one edge of the associated ports so that rotary movements of the valve piston from the illustrated position thereof in either direction will produce substantially instantaneous port openings which progressively increase with greater magnitudes of relative movement of the valve piston and sleeve.

The valve piston 46, in the embodiment illustrated, is operatively connected with the rotor of either the coarse or fine Selsyn receiver through suitable couplings which comprise the first coupling element 53 which is secured to the valve piston 46 by means of pin 54 and a second coupling element 55 which is secured to the rotor of the Selsyn receiver. A helical torsion spring 56 is secured at opposite ends thereof to the coupling elements 53 and 55, respectively, whereby rotary movement of the rotors of the Selsyn receivers are transmitted to the valve pistons of the respective coarse or fine control valves.

By virtue of the gear train connection between the coarse and fine transmitters, the valve piston of the coarse valve will rotate to the same angular extent as the reference member while the valve piston of the fine control valve will rotate, for the values herein assumed, through an angular displacement equal to twenty-seven times the displacement of the reference member. Since the valve pistons are rotating relative to the valve sleeve they control the operation of the servo motor and each, in effect, provides a reference corresponding in some ratio to the reference provided by the reference member. Likewise, the valve sleeves also provide, as hereinafter more particularly described, a reference which is primarily indicative of the movement or position of the positionable element driven by the servo. In other words, assuming that the reference member is displaced at a given velocity, the associated rotary valve spools will be moved thereby to uncover one or more of the associated ports whereby to effect an operation of the servo to drive its load or positionable element in the same direction as that in which displacement of the reference member occurs and substantially at the same rate. Hence, when the servo, assuming a stroking piston controls the rate thereof, is operating at the rate corresponding to the rate of the reference member, the controlling port openings in the control valves should be closed and the positionable element will then continue closely to follow the reference member, assuming that its rate remains constant. Hence, movement of the load or positionable element should be reflected in a movement of the valve sleeves and the movements of the respective valve sleeves should bear the same ratio to each other as the movements of their associated valve spools.

In considering the operation of these valves, the operation of each being substantially identical, let us assume, considering valve 11, that the conduit 20 is connected to a source of fluid under pressure; a conduit 21 is connected with one side of a hydraulic motor or the head end of the cylinder of a stroking piston; that conduit 22 is connected to the other side of said motor or the crank end of said cylinder; and the conduit 23 is connected to exhaust or to a suitable sump. When the valve piston occupies the position shown in Fig. 3, fluid under pressure may pass from the conduit 20 through the groove 26 and ports 30, the interior passage formed by the groove 36 in the valve sleeve and through ports 38 to the bore of the valve sleeve between the spaced lands 47 and 52 of the valve spool. However, the valving surface of the valve spool closes the ports 42 and 45 and hence fluid under pressure cannot be supplied either to the conduits 21 or 22. Likewise, in the above assumed relative position of the valve spool and sleeve, ports 44 and 43 are also closed by the valving portion of the spool. The exhaust conduit 23, however, lies in communicating with the bore of the sleeve between the lands 48 and 52, this connection being established through the ports 39, groove 37, ports 31 and groove 29.

Assuming that the valve spool rotates to some extent in a counter-clockwise direction relative to the sleeve as viewed in Fig. 3, ports 42 and 44 will be uncovered and to an extent depending upon the degree of such relative movement thereby permitting fluid under pressure to pass from the space between the lands 47 and 52 through the port 42 and port 32 and groove 27 to the conduit 21, thereby supplying fluid under pressure to one side of the motor or to one side of the stroking piston. Since port 44 is simultaneously uncovered with port 42, the space between the lands 48 and 52 of the valve spool, which continuously communicates with the exhaust conduit 23, will be connected through ports 44 and 33 and groove 28 with conduit 22, thereby connecting the other side of the motor or stroking piston with exhaust. Under the above assumed conditions, fluid under pressure will cause the motor or stroking piston to be operated under fluid pressure supplied to the head end thereof and, in the case of the stroking piston, the rate of movement thereof will depend upon the size of the port opening, and the magnitude of such movement will depend upon the duration of the port opening.

Under the assumed conditions of relative rotation of the valve spool and sleeve, it will be observed that the ports 45 and 43 will be closed by the valving surface of the valve spool. Therefore, fluid cannot flow through these ports. However, if the valve piston is moved in a clockwise direction from the position thereof shown in Fig. 3, the ports 42 and 44 will remain closed but the ports 45 and 43 will be opened to some degree. When this occurs, fluid under pressure within the bore of the valve sleeve and between the lands 47 and 52 cannot pass to the conduit 21 and the head end of the stroking piston but will pass through the port 45, groove 41 to port 33, the valving surface of the spool closing the port 44 and thereby preventing escape of fluid therethrough. Fluid under pressure will therefore pass from port 33 and associated groove 28 to the conduit 22 and thence to the crank end of the hydraulic motor or stroking piston. At the same time, the space between the lands 48 and 52 will be connected through port 43 and groove 40 with port 32, port 42 being closed by the valving surface of the spool from communication with the interior bore of the valve sleeve. But, fluid may pass to groove 40 from port 32 which communicates through groove 27 with the conduit 21. Hence, the head end of the stroking cylinder will be connected with exhaust. Arrows in full line represent one condition of operation and arrows in dotted line represent a second condition.

Obviously, the direction of relative rotation of the valve piston and valve sleeve will determine the direction of operation of the servo motor controlled thereby, and the magnitude of such relative rotation will control the rate at which the servo is operated. For relative departure of orientation between the reference member and follow-up element, the valve spool and sleeve of both coarse and fine control valves will be relatively rotated, but, of course, to different magnitudes of extent depending upon the gearing ratios therebetween. The relative operational characteristics of the coarse and fine control valves in terms of angular position of valve sleeve is graphically depicted in Fig. 8 wherein curve 68 represents the stroking piston rates provided the coarse valve were connected directly to control the stroking piston as above described and it is rotated through 180° in opposite directions toward zero or the point corresponding to synchronized operation of the reference member and positionable element. Curve 69 in a similar manner depicts the stroking piston rates which would be provided by the fine control valve if operatively connected continuously to control the stroking piston and when movement thereof corresponding to the above-described movement of the coarse control valve occurs.

The curve above the axes a—a indicates decreasing angle of sleeve while that below the axes indicates increasing angle of sleeve and, in each case, representing operations of the servo but in opposite directions toward the zero point. It will be observed that between the 180° and 0° points the stroking piston rates, as controlled by the coarse valve, vary from zero to maximum and back to zero again at the zero position, while the corresponding stroking piston rates, if controlled by the fine control valve, vary from zero to a maximum on the decreasing angle side of the curve and back through zero to a maximum on the increasing angle side, and that this continues thirteen and one-half times throughout 180° because of the 27:1 assumed ratio.

The manner in which an hydraulic synchronizer shifts control of the servomotor from the coarse or fine control valve to the other is shown in my parent application Serial No. 487,395, but it will be observed at this point that a much more accurate control will be effected if the fine control valve is operatively connected with the servomotor for small error angles than if a coarse control valve alone, having a 1:1 ratio of movement with respect to the reference member, were employed in its stead.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. A balanced fluid control valve comprising a body having an axially extending bore, inlet and exhaust passages and two intermediate passages therein communicating through ports with said bore, a sleeve rotatably mounted within said bore, and valve means rotatably disposed within said sleeve for controlling the flow of fluid between said passages, said sleeve being provided with encircling, exterior grooves adapted to register with the ports of said intermediate passages and passages connecting therewith and terminating in ports communicating with the interior of said sleeve, said valve means including a land disposed intermediate the ports of said intermediate passages for preventing communication therebetween through the interior of said sleeve, and said last-mentioned passages forming means for passing fluid axially of said sleeve from one side of said land to the other.

2. A balanced fluid control valve comprising a body having an axially extending bore and inlet, exhaust and two intermediate passages communicating with said bore through ports axially spaced therealong, a sleeve rotatably fitted within said bore and having an axially extending interior bore, valve means rotatably fitted within the bore of said sleeve, said sleeve being provided interiorly thereof with a pair of passages each terminating at the ends thereof in axially spaced ports communicating with the bore thereof, means for continuously connecting one end of each passage with the intermediate ports, said valve means including means forming a closure of the bore of said sleeve between the ports at opposite ends of said interior passages, and means operable when said sleeve and valve means are relatively rotated to place one end of each of said interior passages in communication with the bore of said sleeve on opposite sides, respectively, of said closure means and, alternatively, the other end of each of said interior passages with said sleeve bore on opposite sides, respectively, of said closure means.

3. A balanced fluid control valve comprising a body having an axially extending bore therein and an inlet passage, an exhaust passage and a third and fourth passage communicating with said bore through ports spaced axially therealong, a sleeve rotatably fitted within said bore and having a plurality of circumferentially extending grooves adapted to register respectively with said ports, a valve element rotatably fitted within said sleeve and having end lands and an intermediate land spaced axially therefrom, said sleeve having a passage connecting the groove registering with the inlet ports with the interior of said sleeve in a zone between one end land and the intermediate land and a passage connecting the groove registering with the exhaust port with the interior of said sleeve in a zone between the other end land and the intermediate land, said sleeve having a pair of interior, axially spaced ports communicating respectively with the grooves registering with the said third and fourth passages and the interior port diametrically opposite each of said pair of ports, passages respectively connecting one of said last mentioned ports with that one of said pair of ports spaced axially therefrom, and the intermediate land of said valve element being formed with a continuous cylindrical central portion and with valving edges in the surface thereof on axially opposite sides of said central portion whereby to control fluid transfer from said inlet port to one or the other of said third and fourth passages while simultaneously controlling fluid transfer from the other of said third and fourth passages to exhaust.

4. A balanced fluid control valve comprising a body having an axially extending bore therein and an inlet passage, an exhaust passage and a third and fourth passage communicating with said bore through ports spaced axially therealong, a sleeve rotatably fitted within said bore and having a plurality of circumferentially extending grooves adapted to register respectively with said ports, a valve element rotatably fitted within said sleeve and having end lands and an intermediate land spaced axially therefrom, said sleeve having a passage connecting the groove registering with the inlet ports with the interior of said sleeve in a zone between one end land and the intermediate land and a passage connecting the groove registering with the exhaust port with the interior of said sleeve in a zone between the other end land and the intermediate land, said sleeve having a pair of interior, axially spaced ports communicating respectively with the grooves registering with the said third and fourth passages and an interior port diametrically opposite each of said pair of ports, passages respectively connecting one of said last mentioned ports with that one of said pair of ports spaced axially therefrom, and the intermediate land of said valve element being formed with a continuous cylindrical central portion and discontinuous cylindrical portions on axially opposite sides of said central portion adapted cooperatively with the interior ports of said sleeve simultaneously to control fluid flow between said inlet and one of said third and fourth passages and between the other of said third and fourth passages and exhaust.

5. A valve of the character recited in claim 4 in which the discontinuous cylindrical portions of the intermediate land of the valve element are each provided with a cut-out portion forming valving edges arranged to cooperate with the interior, diametrically opposed ports of the sleeve, and the cylindrical surfaces of said land lying between said edges being of sufficient circumferential extent as to overlie said opposed interior ports.

6. A balanced fluid control valve comprising a body having an axially extending bore therein and an inlet passage, an exhaust passage and a third and fourth passage communicating with said bore through ports spaced axially therealong, a sleeve rotatably fitted within said bore, a valve element rotatably fitted within said sleeve and having end lands and an intermediate land spaced axially therefrom, said sleeve having passages communicating with said inlet, exhaust and third and fourth passages, respectively, and said passages terminating in axially spaced ports interiorly of said sleeve, two of said interior ports communicating with the spaces between the intermediate and end lands of said valve element, and the intermediate land of said valve element having a continuous cylindrical central portion and valving edges disposed to axially opposite sides thereof and adapted cooperatively with the other two of said interior ports to control fluid flow therethrough.

7. In a balanced fluid control valve comprising a body having an axially extending bore therein and a pair of passages communicating with said bore through ports spaced axially therealong, a sleeve rotatably fitted within said bore and having a first pair of interior, axially spaced ports, passages connecting said ports respectively with the passages in said body, and a second pair of interior, axially spaced ports disposed in circumferentially spaced relation to said first pair of interior ports, a cylindrical valve element rotatably fitted within said sleeve and having a continuous cylindrical central portion to block fluid flow and cut-out zones on axially opposite sides of said central portion to form valving means respectively cooperable with said interior ports to control communication between said ports and the cut-out zones, and said sleeve having a pair of passages connecting respectively one of the first pair of ports cooperating with one of said valving means with one of the second pair of ports cooperating with the other valving means, the surface portions of said valve element being arranged to overlie one of the interior ports so connected together when uncovering the port connected therewith.

8. A fluid control valve of the character recited in claim 7 in which the second pair of ports in the interior of said sleeve lie substantially diametrically opposite respective ones of said first pair of interior ports.

9. A fluid control valve of the character recited in claim 7 in which the second pair of ports in the interior of said sleeve lie substantially diametrically opposite respective ones of said first pair of interior ports and the peripheral extent of said valve in transverse zones coplanar with said cut-out zones is sufficient simultaneously to overlie those ports opposite each other.

10. The combination recited in claim 7 together with means for supplying fluid under pressure to one of said cut-out zones and means for connecting the other cut-out zone to exhaust.

11. The combination recited in claim 7 in which the passages connecting respective ports of the first and second interior pairs of ports are formed within the wall of said sleeve.

12. A balanced fluid control valve comprising a body having an axially extending bore and an inlet, a pair of outlet passages communicating with said bore through ports axially spaced therealong, a sleeve rotatably fitted within said bore and having an axially extending interior bore, valve means rotatably fitted within the bore of said sleeve, said sleeve being provided interiorly thereof with a pair of passages each terminating at the ends thereof in axially spaced ports communicating with the bore thereof, means for continuously connecting one end of each of the interior passages of said sleeve with each of said outlet passages respectively, said valve means including means forming a closure of the bore of said sleeve between the axially spaced ports of the interior passages of said sleeve, and means operative when said sleeve and said valve means are relatively rotated in one direction to place one end of each of said interior passages of the sleeve in communication with the bore of said sleeve on opposite sides, respectively, of said closure means and, alternatively, when said sleeve and valve means are relatively rotated in the opposite direction, to place the other end of each of said interior passages in communication with said sleeve bore on opposite sides, respectively, of said closure means, whereby to control the flow of fluid from said inlet to one or the other of said outlet passages depending upon the direction of relative rotation of said sleeve and valve.

EDWARD DAWSON.

REFERENCES CITED

The following references are of record in the file of this patent:

UNITED STATES PATENTS

| Number | Name | Date |
|---|---|---|
| 2,003,292 | Holzwarth | June 4, 1935 |
| 2,349,641 | Tucker | May 23, 1944 |